UNITED STATES PATENT OFFICE.

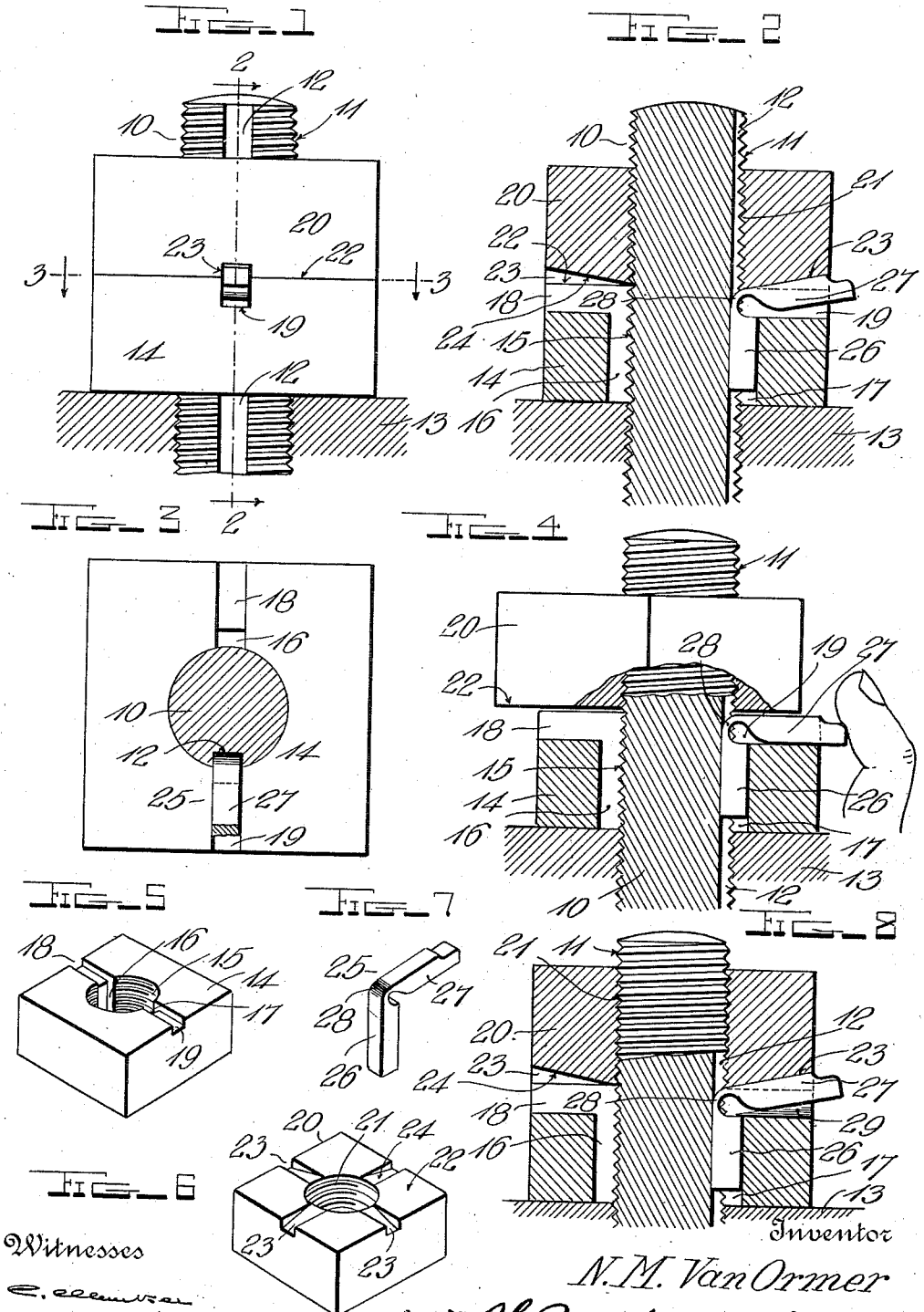

NER M. VAN ORMER, OF RYDE, PENNSYLVANIA.

NUT-LOCK.

1,018,855. Specification of Letters Patent. Patented Feb. 27, 1912.

Application filed April 12, 1911. Serial No. 620,632.

*To all whom it may concern:*

Be it known that I, NER M. VAN ORMER, a citizen of the United States, residing at Ryde, in the county of Mifflin and State of Pennsylvania, have invented certain new and useful Improvements in Nut-Locks; and I do declare the following to be a full, clear, and exact description of the invention, such as will enable others skilled in the art to which it appertains to make and use the same.

My invention is in the nature of a nut lock for general purposes, but especially adapted for locking the nuts on bolts in pitmen in threshing machines, harvesters and other farm machinery and in railway joints.

The object of the invention is to provide a nut lock which will rigidly lock two nuts together and at the same time permit of being readily unlocked, and to provide also additional means whereby the two nuts may be permanently locked together so that they cannot be separated without breaking or injuring it.

With these objects in view the invention consists in the improved construction, arrangement and combination of parts hereinafter fully described and afterward specifically claimed.

In order that the construction and operation of the invention may be readily understood, I have illustrated a preferred embodiment of it in the accompanying drawing, in which:

Figure 1 is a view in side elevation, the nuts being locked together; Fig. 2 is a longitudinal sectional view on the broken line 2—2 of Fig. 1, with the parts in the same position as in Fig. 1; Fig. 3 is a transverse sectional view on the broken line 3—3 of Fig. 1; Fig. 4 is a view partly sectional on the same plane as Fig. 2 and partly in elevation, the locking device being shown depressed or in its inoperative position, and the outer nut partially turned from its position shown in Fig. 2; Fig. 5 is a perspective view of the lower nut; Fig. 6 is a perspective view of the upper nut, inverted; Fig. 7 is a detail perspective view of the locking member, and Fig. 8 is a longitudinal sectional view on the same plane as Figs. 2 and 4, showing a modification of the invention for permanently locking the nuts together.

Like reference numerals mark the same parts wherever they occur in the various figures of the drawings.

Referring to the drawings, 10 indicates a bolt provided with any usual form of thread 11, and also with a longitudinal groove 12 which is rectangular in cross sectional form. The inner nut 14, which will be turned up against a part 13 through which the bolt passes, may be of any preferred outline, being here shown as square, although it will be obvious that hexagonal, rectangular, or other forms might be used. The nut is threaded at 15 as is usual, and is provided in its inner threaded walls with longitudinal grooves 16, 17, of which there may be any desired number and which are adapted, during the turning of the nut upon the bolt, to be brought into register with the groove 12 of the bolt. Leading from each of the longitudinal grooves 16, 17, is a transverse groove, as at 18, 19, which is of the same general dimensions as the longitudinal groove 12 of the bolt and the longitudinal grooves 16 and 17 of the nut. The outer nut is shown in detail in Fig. 6 at 20. It is also threaded as is usual, at 21, and its inner face 22 is provided with any desired number of radial grooves 23 which are, at their outer ends, of substantially the same width and depth as the grooves in the bolt and the inner nut, but which decrease in depth toward the center, the bottom 24 being inclined until, at the center, the grooves disappear.

In Fig. 7 I have shown my locking member which is preferably a rectangular bar of spring steel of dimensions to fit in the grooves of the bolt and the nut, the locking member as a whole being indicated at 25 and comprising an end 26 of the original form of the bar, separated from another end 27 of substantially the same form but connected thereto by a thin neck 28, the bar being bent, at this thin neck, to a slightly obtuse angle, as clearly shown.

Assuming that the nuts are to be locked upon the bolt, the inner nut 14 is turned up until one of the grooves 16, 17, is in register with the groove 12 of the bolt. The end 26 of the locking member is now inserted in the opening between the bolt and the nut formed by registering grooves of the bolt and nut, into which it will snugly fit and prevent the nut 14 from being turned on the bolt. The end 27 of the locking member will rest in the horizontal groove which leads from the vertical groove in which the end 26 has been placed; that is to say, assuming that the end 26 has been placed in the groove 17, the end 27 will rest partially in the groove 19 but will project, owing to the fact that it lies at an obtuse angle with the end 26 above the walls of the groove 19, and will be held in this elevated projecting position yieldingly by means of the spring neck 28. The outer nut 20 will now be turned upon the bolt until its inner face comes in contact with the projecting end 27 of the locking member, and this projecting end 27 will then act as a latch, which will spring into the first one of the grooves 23 of the nut 20, which is brought onto register with it. In order that the nut 20 may not be locked against turning until it is brought into close contact with the nut 14, the latch end 27 of the locking member will be depressed into the position indicated in Fig. 4, in which it is held wholly in the groove 19 until the nut 20 is turned up to the position in which it is desired to lock it. In this position, one of the grooves 23 will be in register with the groove 19 and the latch end 27 being released will spring into the position shown in Fig. 2 in which substantially one-half of it is in the groove 23 and the other half in the groove 19. Inasmuch as the grooves and the latch bar are rectangular in outline, and the further fact that the latching bar fits snugly in the grooves, all strains tending to turn the nut 20 when it is locked in position, as shown in Fig. 2, will be brought directly against the main body of the latch member and will bring no strain whatever against the thin resilient connecting neck 28, the effect produced by the latch member being the same as though it were an independent member.

From the foregoing it will be readily observed that the nut 20 may be adjusted with great nicety by providing it with a number of grooves 23 and that it may be readily released by depressing the latch member into the position shown in Fig. 4 which would leave said nut free to be turned off the bolt, but at the same time the nut 14 will still be firmly locked on the bolt. The nut 14 however may be readily removed by withdrawing the end 26 of the locking member from the groove 17.

It may be found desirable at times to permanently lock the nuts together so that they will not be released by unauthorized persons and so that they can only be released by breaking or marring them. For such purposes I have provided the modified means illustrated in Fig. 8, in which the parts are the same as hereinbefore described, and the position illustrated the same as that in Fig. 2. In this position the wedge 29 is driven into the groove 19 beneath the latch end 27 of the locking member 25. This wedge is driven in until its outer end is at least flush with, if not sunken in, the groove 19, which will effectually hold the latch end 27 in its raised position in the groove 23 and prevent the depression of the latch to the position shown in Fig. 4, obviously preventing the removal of either of the nuts from the bolt. The wedge 29 cannot be removed without cutting or boring it out or chipping away some of the surrounding parts, so that it forms, in effect, a permanent lock.

While I have specifically described the construction of the various parts forming my improved nut lock, and have specified their outline in detail, it will be obvious to those skilled in the art that many changes and variations may be made in such construction and outline without departing from the spirit and scope of the invention.

Having thus described my invention what I claim is:—

1. A nut lock comprising a bolt provided with a longitudinal groove, an inner nut provided with a radial groove in its outer face and a groove adapted to be brought into register with the groove of the bolt thereby forming a compound groove, a locking member adapted to be snugly fitted into the compound groove of the bolt and inner nut and projecting outwardly therefrom into the vertical plane of the radial groove, and an outer nut adapted to press the projection of the locking member into the radial groove and provided with means engaging the locking member to prevent the outer nut turning.

2. A lock nut comprising a bolt provided with a longitudinal groove, an inner nut provided with a radial groove in its outer face and a groove adapted to be brought into register with the groove of the bolt thereby forming a compound groove, a locking member comprising two ends resiliently connected together, one of said ends adapted to be snugly fitted in the compound groove of the bolt and inner nut and the other end to project yieldingly into the vertical plane of the radial groove, and an outer nut adapted to press the projecting end of the locking member into the radial groove and provided with means engaging the radial end of the locking member to prevent the outer nut turning.

3. A nut lock comprising a bolt provided with a longitudinal groove, an outer nut, an inner nut provided with a groove adapted to be brought into register with the groove of the bolt thereby forming a compound groove, and a locking member adapted to be snugly fitted into the compound groove of the bolt and inner nut and projecting therefrom into the path of movement of the outer nut, said outer nut being provided with radial grooves on its inner face to coact with said projecting end.

4. A nut lock comprising a bolt provided with a longitudinal groove, an outer nut, an inner nut provided with a groove adapted to be brought into register with the groove of the bolt thereby forming a compound groove, and a locking member comprising two ends resiliently connected together, one of said ends adapted to be snugly fitted in the compound groove of the bolt and inner nut and the other end to project yieldingly into the path of the outer nut, said outer nut being provided with radial grooves on its inner face to co-act with said yieldingly projected end.

5. A nut lock comprising a bolt having a longitudinal groove, an outer nut having a radial groove in its inner face, an inner nut provided with a radial groove in its outer face and a longitudinal groove adapted to be brought into register with the groove of the bolt forming a compound groove, and a locking member comprising two rectangular ends joined by a thin resilient neck, one end being adapted to fit snugly in the compound groove and the other end lying at an obtuse angle thereto and adapted to project into the radial grooves of the outer and inner nuts.

6. A nut lock comprising a bolt having a longitudinal groove, an outer nut, an inner nut provided with a longitudinal groove adapted to be brought into register with the groove of the bolt forming a compound groove, and a locking member comprising two rectangular ends joined by a thin resilient neck, one end being adapted to fit snugly in the compound groove and the other end lying at an obtuse angle thereto and projecting in the path of movement of the outer nut, the inner and outer nuts being provided with radial grooves in their meeting faces to co-act with said projecting end, the radial grooves of the inner nut being of equal depth throughout and those of the outer nut increasing in depth from the center outward.

7. A nut lock comprising a bolt, an inner nut provided with a radial groove in its outer face of equal depth throughout, an outer nut provided with a radial groove in its inner face increasing in depth from the center outward, the two grooves when in register forming a compound radial groove increasing in depth outwardly, a locking member adapted to be seated between and to lock the bolt and inner nut together and having a projecting latch end in the compound radial groove, and a wedge driven into the compound radial groove by the side of said latch end to prevent the displacement of the projecting latch end.

In testimony whereof I have hereunto set my hand in presence of two subscribing witnesses.

NER M. VAN ORMER.

Witnesses:
L. O. HILTON,
M. A. WOOD.

---

Copies of this patent may be obtained for five cents each, by addressing the "Commissioner of Patents, Washington, D. C."